(12) United States Patent
Zhang et al.

(10) Patent No.: US 11,456,667 B2
(45) Date of Patent: Sep. 27, 2022

(54) CONSTANT RIPPLE INJECTION CIRCUIT FOR SWITCHING CONVERTER

(71) Applicant: TEXAS INSTRUMENTS INCORPORATED, Dallas, TX (US)

(72) Inventors: Liang Zhang, Beijing (CN); Weibing Jing, Beijing (CN); Dan Li, Beijing (CN); Qi Yang, Beijing (CN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 57 days.

(21) Appl. No.: 17/008,253

(22) Filed: Aug. 31, 2020

(65) Prior Publication Data

US 2021/0313885 A1 Oct. 7, 2021

Related U.S. Application Data

(63) Continuation of application No. PCT/CN2020/082786, filed on Apr. 1, 2020.

(30) Foreign Application Priority Data

Apr. 1, 2020 (WO) ................ PCT/CN2020/082786

(51) Int. Cl.
*H02M 3/158* (2006.01)
*H02M 1/08* (2006.01)

(52) U.S. Cl.
CPC ............. *H02M 3/158* (2013.01); *H02M 1/08* (2013.01)

(58) Field of Classification Search
CPC ....... H02M 3/158; H02M 1/08; H02M 1/0009
See application file for complete search history.

(56) References Cited

U.S. PATENT DOCUMENTS

| | | | | |
|---|---|---|---|---|
| 2009/0273326 A1* | 11/2009 | Lipcsei | ................ | H02M 3/1588 323/282 |
| 2014/0361755 A1* | 12/2014 | Tateishi | ................ | H02M 3/158 323/271 |
| 2019/0157973 A1* | 5/2019 | Mihashi | ................ | H02M 3/156 |
| 2021/0211052 A1* | 7/2021 | Zhao | ..................... | H02M 3/158 |

OTHER PUBLICATIONS

International Search Report and Written Opinion dated Jan. 4, 2021, PCT/CN2020/082786, 6 pages.

* cited by examiner

*Primary Examiner* — Kyle J Moody
*Assistant Examiner* — Jye-June Lee
(74) *Attorney, Agent, or Firm* — Michelle F. Murray; Charles A. Brill; Frank D. Cimino

(57) ABSTRACT

A system includes an input voltage node configured to provide an input voltage. The system also includes a load and a switching converter coupled between the input voltage node and the load. The switching converter is configured to provide an output voltage to the load based on the input voltage. The switching converter includes gate driver circuitry and a comparator coupled to the gate driver circuitry. The switching converter also includes a constant ripple injection circuit coupled to the comparator. The constant ripple injection circuit is configured to provide a positive current sense signal and a negative current sense signal to the comparator based on the input voltage and the output voltage.

22 Claims, 13 Drawing Sheets ic IC technology has resulted in the commercialization of IC products. As new consumer electronic devices are developed and IC technology advances, new IC products are commercialized. One example IC product that is needed in consumer electronic devices is a switching converter. There are many types of switching converters and output voltage regulation strategies.

CONSTANT RIPPLE INJECTION CIRCUIT FOR SWITCHING CONVERTER

This Application is a Continuation of PCT Application No. PCT/CN2020/082786, filed on Apr. 1, 2020, which Application is hereby incorporated herein by reference in its entirety.

BACKGROUND

The proliferation of consumer electronic devices and integrated circuit (IC) technology has resulted in the commercialization of IC products. As new consumer electronic devices are developed and IC technology advances, new IC products are commercialized. One example IC product that is needed in consumer electronic devices is a switching converter. There are many types of switching converters and output voltage regulation strategies.

In one example switching converter, the output voltage is regulated based on directed feedback, which results in a control signal referred to as ripple injection. The amplitude of ripple injection varies with $V_{IN}$ and $V_{OUT}$. In large duty-cycle scenarios (e.g., VIN=6V, VOUT=5V) and in small duty-cycle scenarios (e.g., VIN=12V, VOUT=1V), ripple injection variance is increased. Existing efforts to manage ripple injection variance limit switching converter bandwidth and $V_{OUT}$ range.

SUMMARY

In accordance with at least one example of the disclosure, a system comprises an input voltage node configured to provide an input voltage. The system also comprises a load and a switching converter coupled between the input voltage node and the load, wherein the switching converter is configured to provide an output voltage to the load based on the input voltage. The switching converter comprises a gate driver circuitry and a comparator coupled to the gate driver circuitry. The switching converter also comprises a constant ripple injection circuit coupled to the comparator, wherein the constant ripple injection circuit is configured to provide a positive current sense signal and a negative current sense signal to the comparator based on the input voltage and the output voltage.

In accordance with at least one example of the disclosure, a control circuit for a switching converter comprises a first circuit coupled to an input voltage node. The control circuit also comprises a second circuit coupled to a switch node. The control circuit also comprises a third circuit coupled to an output of the first circuit and to an output of the second circuit. The third circuit comprises a ripple injection charge capacitor and a constant charge control circuit coupled to the ripple injection charge capacitor.

In accordance with at least one example of the disclosure, a switching converter comprises an input voltage node, a switch node, and gate driver circuitry. The switching converter also comprises a comparator coupled to the gate driver circuitry. The switching converter also comprises a ripple injection circuit coupled to the comparator, the input voltage node, and the switch node. The constant ripple injection circuit is configured to provide a constant ripple injection value even if at least one of an output voltage of the switching converter and an input voltage of the switching converter varies over time.

BRIEF DESCRIPTION OF THE DRAWINGS

For a detailed description of various examples, reference will now be made to the accompanying drawings in which.

DETAILED DESCRIPTION

Disclosed herein are constant ripple injection circuit topologies and related switching converter circuits and systems. In some examples, the constant ripple injection circuit is part a DC-DC switching converter with direct feedback from the switch node, with ripple injection, and with adaptive constant on-time control. In some examples, the constant ripple injection circuit is configured to output a positive current sense signal and a negative current sense based on the input voltage (VIN) of the switching converter and the output voltage (VOUT) of the sensing converter. The positive and negative current sense signals are provided to a comparator, which outputs a switch-on signal based on the positive and negative current sense signals, a reference voltage, and a feedback voltage.

In some examples, constant ripple injection circuit is part of a control circuit for a switching converter, where the constant ripple injection circuit includes a first circuit coupled to an input voltage node. The constant ripple injection circuit also includes second circuit coupled to a switch node of the switching converter. The constant ripple injection circuit also includes a third circuit coupled to an output of the first circuit and to an output of the second circuit. The third circuit includes a ripple injection charge capacitor and a constant charge control circuit coupled to the ripple injection charge capacitor. In some examples, the constant charge control circuit includes a multiplier circuit, where the multiplier circuit generates a charge current as ICHG=IREF*VIN/(VIN−VOUT). During the on period of the low-side power FET, ICHF*TOFF=C*VRIP, where TOFF=(VIN−VOUT)*T/VIN, and where T is the switching period. Accordingly, VRIP=IREF*T/C, which is constant at different VIN and VOUT values. To provide a better understanding, various constant ripple injection circuit issues, and related circuits or systems are described using the figures as follows.

Figure 1:
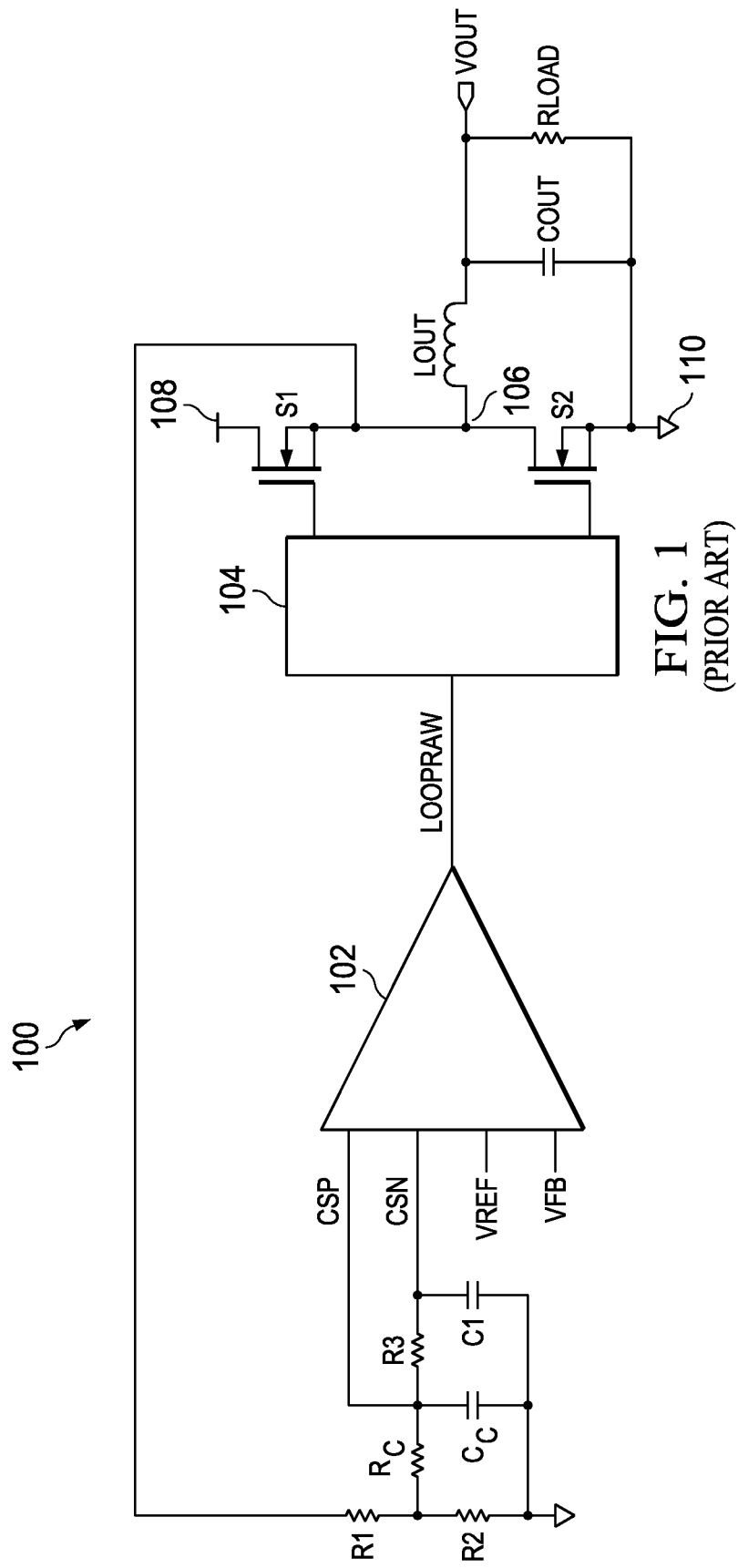
FIG. 1 is diagram of a switching converter in accordance with some examples.

FIG. 1 is diagram of a switching converter 100 in accordance with some examples. As shown, the switching converter 100 comprises a high-side switch (S2) and a low-side switch (S2) between a $V_{IN}$ node 108 and a ground node 110. Between S1 and S2 is a switch node 106 coupled to a first end of an output inductor (LOUT). The second end of LOUT is coupled to a first (e.g., top) terminal of an output capacitor (COUT), and the second (e.g., bottom) terminal of COUT is coupled to the ground node 110. As shown, a load (RLOAD) is in parallel with COUT, where COUT maintains $V_{OUT}$ for use by RLOAD.

To control S1 and S2, the switching converter uses gate driver circuitry 104 to provide grate drive signals to S1 and S2, where the gate driver circuitry 104 generates the gate drive signals based on a control signal (LOOPRAW) provided by a comparator 102. In the example of FIG. 1, the comparator 102 generates LOOPRAW based on a reference voltage (VREF), a feedback voltage (VFB), a positive current sense signal (CSP), and a negative current sense signal (CSN). As shown, CSP and CSN are provided by a ripple injection circuit corresponding to R1, R2, R3, $R_C$, $C_C$, and C1. Over time, RLOAD and VIN may vary. Also, a VOUT target may vary. With the ripple injection circuit of FIG. 1, the value of $C_C$ can be selected to account for VIN and VOUT variance, but this limits the bandwidth of the switching converter 100. Also, high VOUT targets (e.g., 20V or higher) are not supported.

Figure 2:
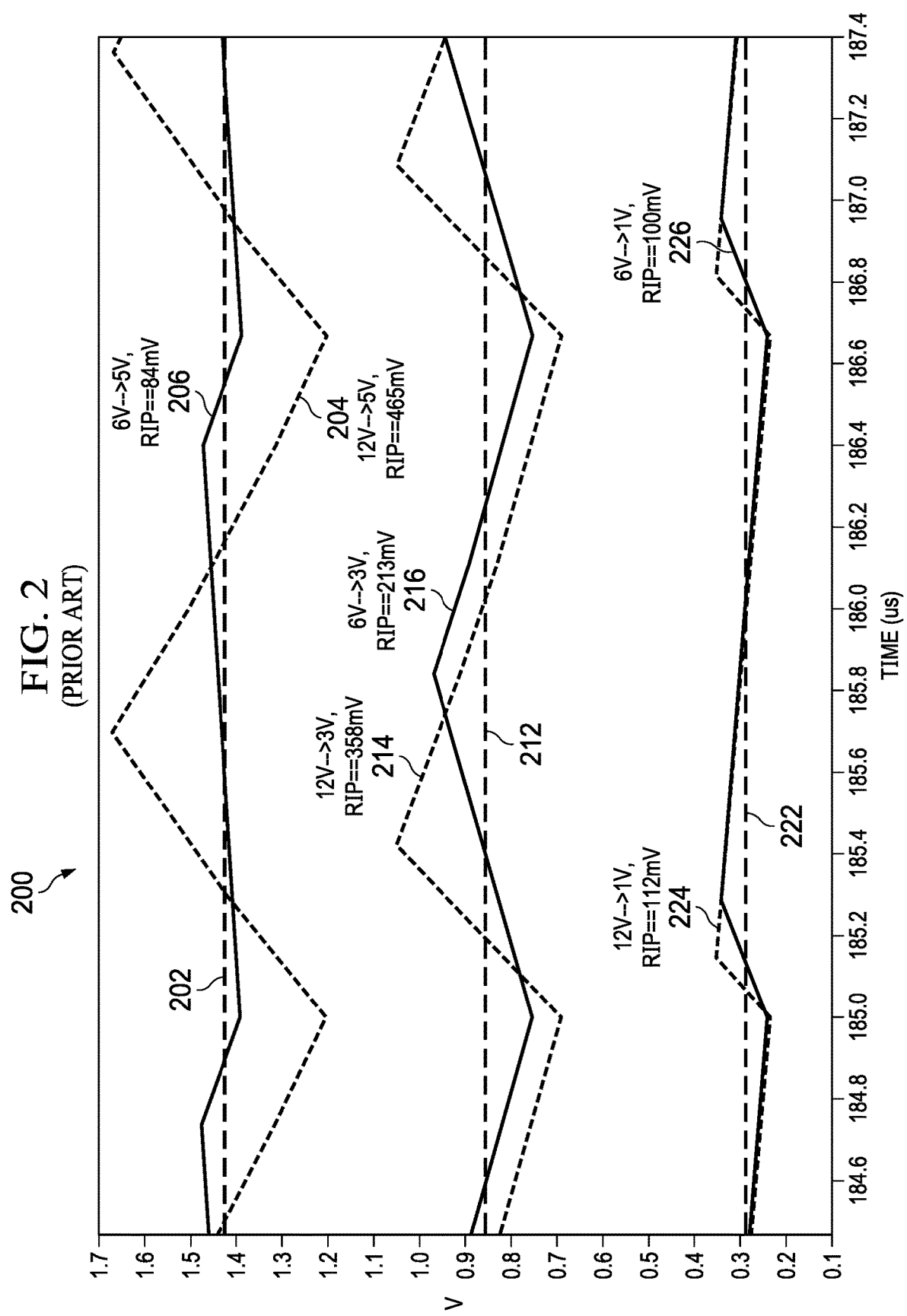
FIG. 2 is a timing diagram of ripple injection waveforms for different output voltage (VOUT) transitions of a switching converter in accordance with some examples.

FIG. 2 is a timing diagram 200 of ripple injection waveforms 204, 206, 214, 216, 224, and 226 for different $V_{OUT}$ transitions of a switching converter (e.g., the switching converter 100 in FIG. 1) in accordance with some examples. In the timing diagram 200, the ripple injection waveform 204 represents a ripple injection when VOUT transitions from 12V to 5V, where the ripple injection waveform 204 has a ripple magnitude of 465 mV centered around a first baseline value 202 (around 1.4V). The ripple injection waveform 206 represents a ripple injection when VOUT transitions from 6V to 5V, where the ripple injection waveform 206 has a ripple magnitude of 84 mV centered around the first baseline value 202. The ripple injection waveform 214 represents a ripple injection when VOUT transitions from 12V to 3V, where the ripple injection waveform 214 has a ripple magnitude of 358 mV centered around a second baseline value 212 (around 0.85V). The ripple injection waveform 216 represents a ripple injection when VOUT transitions from 6V to 3V, where the ripple injection waveform 216 has a ripple magnitude of 213 mV centered around the second baseline value 212. The ripple injection waveform 224 represents a ripple injection when VOUT transitions from 12V to 1V, where the ripple injection waveform 224 has a ripple magnitude of 112 mV centered around a third baseline value 222 (around 0.3V). The ripple injection waveform 226 represents a ripple injection when VOUT transitions from 6V to 1V, where the ripple injection waveform 226 has a ripple magnitude of 100 mV centered around the third baseline value 212. As represented in the timing diagram 200, the ripple injection varies for different VOUT transitions. Also, the first, second, and third baseline values 202, 212, and 222 are determined according to VOUT*R2/(R1+R2), where R2/(R1+R2)=1/3.5, and where the final VOUT values (5V, 3V, 1V) are used.

Figure 3:
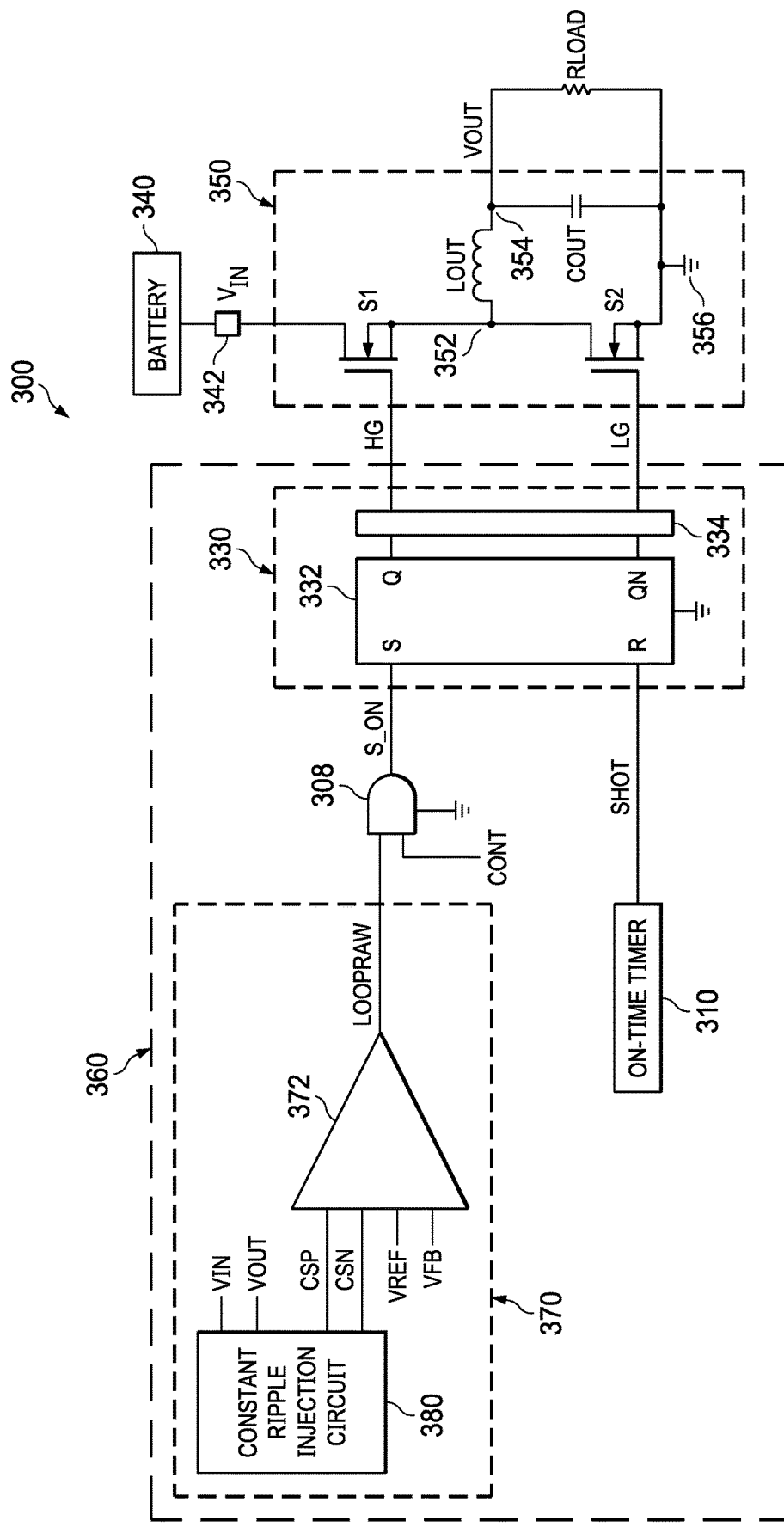
FIG. 3 is a diagram of an electrical system with a constant ripple injection circuit in accordance with some examples.

FIG. 3 is a diagram of an electrical system 300 with a constant ripple injection circuit in accordance with some examples. As shown, the electrical system 300 includes switching converter circuitry 350 and a control circuit 360 for one or more power switches (e.g., S1 or S2) of the switching converter circuitry 350. In the example of FIG. 3, the switching converter circuitry 350 corresponds to a buck converter topology, where S1 is a high-side switch and S2 is a low-side switch. The switching converter circuitry 350 also includes an output inductor (LOUT), and an output capacitor (COUT). In other examples, the switching converter circuitry 350 could have a boost converter topology, or another switching converter topology.

As shown, S1 and S2 are coupled between a battery 340 or other power source, configured to provide VIN, a ground node 356. Also, a first end of LOUT is coupled to a switch node 352 between S1 and S2. Also, a second end of LOUT is coupled to an output node 354. Also, COUT and a load (RLOAD) are coupled in parallel between the output node 354 and the ground node 356. In a first phase (S1 on, S2 off) of the switching converter circuitry 350, the inductor current (IL) ramps up. In a second phase (S1 off, S2 on), IL ramps down. To regulate VOUT at the output node 354, the timing of the first and second phases is controlled by the control circuit 360. As the VIN provided by the battery 340 drops, the control circuit 360 adjusts the timing of the first and second phases to account for this change (e.g., by increasing the amount of the first phase time subject to certain limits such as a minimum off-time).

In the example of FIG. 3, the timing of the first phase and the second phase are a function of various signals including a first control signal (LOOPRAW) output from a summing comparator circuit 370 and a second control signal (SHOT) output from an on-time timer circuit 310. LOOPRAW indicates when to turn S1 on (i.e., LOOPRAW is used to generate a switch on signal, S_ON). Meanwhile, SHOT indicates when to turn S1 off. More specifically, S_ON is output from an AND gate 308 that receives LOOPRAW and a minimum off-time signal (CONT) to ensure S_ON is off for a minimum off-time. Thus, when LOOPRAW and CONT are high, S_ON is high. Otherwise, when either or both of LOOPRAW or CONT are low, S_ON is low. In some examples, CONT is provided by a minimum off-time signal generator (not shown). Often the minimum off-time is a fixed value for a given product. When the minimum off-time of the low-side switch arrives, CONT is asserted.

In the example of FIG. 3, S_ON is provided to a latch 332. The latch 332 is coupled to is part of (as shown) a switch driver circuit 330 configured to provide a high-side drive signal (HG) to S1 and to provide a low-side drive signal (LG) to S2. For example, the Q and QN outputs of the latch 332 can be provided to the driver circuit 334, which is configured to provide sufficient current to drive S1 and S2. Thus, when the latch 332 receives S_ON, the switch driver circuit 330 directs the switching converter circuitry 350 to transition to phase 2 (S1 off, S2 on). In some examples, the latch 332 is an SR latch with a set (S) input node and a reset (R) input node, where the R input node is configured to receive SHOT from the on-time timer circuit 310.

In the example of FIG. 3, the summing comparator circuit 370 comprises a comparator 372 that compares a feedback voltage (VFB) with a target reference voltage (VREF), where VREF is provided by a VREF source (not shown) and VFB is provided by a feedback loop (not shown) that connects to the output node 354. Also, the comparator 372 accounts for variations in load current, where the load current is indicated by CSP and CSN provided by a constant ripple injection circuit 380 coupled to the comparator 372. In operation, the comparator 372 uses CSP and CSN as a ripple injection to adjust VFB. More specifically, CSP and CSP are used to generate a zero to compensate the double pole generated by LOUT and COUT. Otherwise, the control loop will be unstable. In the example of FIG. 2, the inputs to the constant ripple injection circuit 380 include VIN and VOUT, or at least values proportional to VIN and VOUT.

In some examples, a system (e.g., the electrical system 300 in FIG. 3) includes an input voltage node (e.g., VIN node 342 in FIG. 3) configured to provide an input voltage. The system also includes a load (RLOAD) with a variable VOUT range (e.g., 0.6V~7V). In some examples, RLOAD corresponds to a USB power delivery adapter. In other examples, RLOAD corresponds to a light-emitting diode (LED) driver. The system also includes a switching converter (e.g., the switching converter circuitry 350 and the control circuit 360 in FIG. 3) coupled between the input voltage node and the load, where the switching converter is configured to provide VOUT to the load based on VIN. The switching converter includes gate driver circuitry (e.g., the gate driver circuit 330 in FIG. 3) and a comparator (e.g., the comparator 372 in FIG. 3) coupled to the gate driver circuitry. The switching converter also includes a constant ripple injection circuit (e.g., constant ripple injection circuit 380 in FIG. 3) the coupled to the comparator, where the constant ripple injection circuit is configured to provide CSP and CSN to the comparator based on VIN and VOUT. The comparator also receives VFB and VREF as inputs, and wherein the comparator is configured to output a control signal (LOOPRAW or S_ON in FIG. 3) to the gate driver circuitry.

Figure 4:
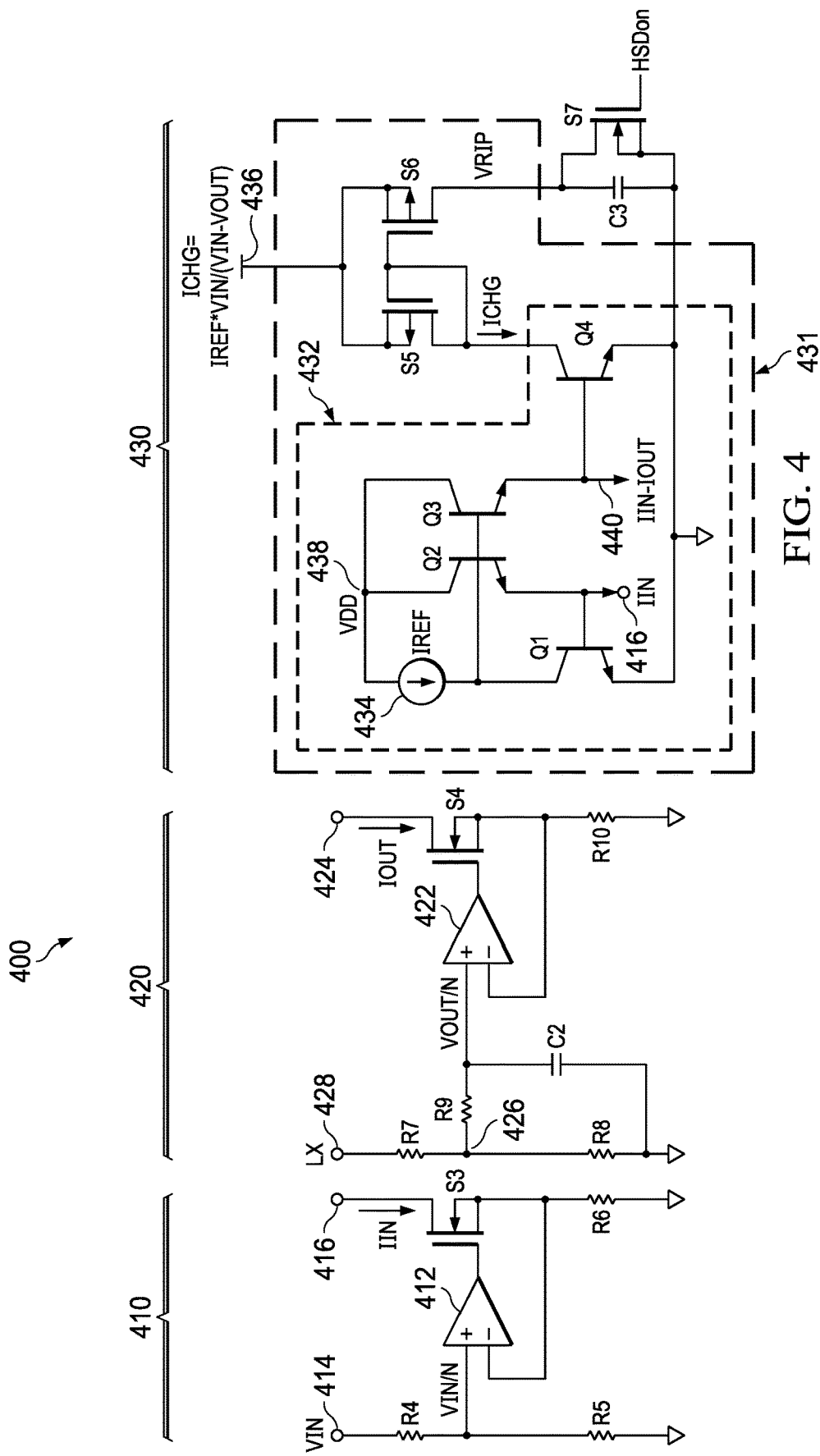
FIG. 4 is a schematic diagram of a constant ripple injection circuit in accordance with some examples.

FIG. 4 is a schematic diagram of a constant ripple injection circuit 400 (an example of the constant ripple injection circuit 380 in FIG. 3) in accordance with some examples. In the example of FIG. 4, the constant ripple injection circuit 400 includes a first circuit 410 configured to output a first current (IIN) proportional to VIN. The constant ripple injection circuit 400 also includes a second circuit 420 configured to output a second current (IOUT) proportional to VOUT. The constant ripple injection circuit 400 also includes a third circuit 430 configured to output a ripple injection voltage (VRIP) based on IIN and IOUT, where CSN correspond to VRIP (e.g., slopes 502, 504, 506, 508, 510, 512 in FIG. 5) and CSP corresponds to a DC voltage (e.g., 140 mV in FIG. 5).

In the example of FIG. 4, the first circuit 410 includes an operational amplifier 412 and a voltage divider (e.g., a voltage divider based on R4 and R5) coupled between a first input of the operational amplifier 412 and a VIN node 414. The first circuit 410 also includes a transistor (S3) coupled to an output of the operational amplifier 412. The first circuit also includes a resistor (R6) coupled between the output of the operational amplifier 412 and a ground node. As shown, the output of the operational amplifier 412 is input to a second input of the operational amplifier 412. The output of the first circuit 410 is IIN, which is provided to a node 416 and is proportional to VIN of a switching converter. In operation, the first circuit 410 ensures the voltage on R6 is equal to VIN/N so that IIN=VIN/(N*R6), wherein N is a scaling factor.

In some examples, the second circuit 420 comprises an operational amplifier 422 and a voltage divider (e.g., a voltage divider based on R7 and R8), where the voltage divider is coupled between a switch node (LX) 428 (e.g., between a high-side switch and a low-side switch) and a ground node. The second circuit 420 also includes an RC filter (e.g., an RC filter based on R9 and C2) between an intermediate node 426 of the voltage divider and a first input of the operational amplifier 422. The second circuit 420 also includes a transistor (S4) coupled to an output of the operational amplifier 422. The second circuit 420 also includes a resistor (R10) coupled between the output of the operational amplifier 422 and a ground node. As shown, the output of the operational amplifier 422 is input to a second input of the operational amplifier 422. The output of the second circuit 420 is IOUT, which is provided to a node 424 and is proportional to VOUT of a switching converter. In operation, the second circuit 420 ensures the voltage at the positive terminal of the operational amplifier 422 is equal to VOUT/N so that IOUT=VOUT/(N*R8), where N is a scaling factor (e.g., the same scaling factor as used for the first circuit 410).

In the example of FIG. 4, the third circuit 430 includes a ripple injection charge capacitor (C3) and a charge control circuit 431 configured to charge C3 based on a reference current (IREF), VIN, and VOUT. The charge control circuit 431 comprises a multiplier circuit 432 configured to provide a charge current. The charge control circuit 431 also includes a current mirror (using transistors S5 and S6) to mirror the charge current provided by the multiplier circuit 432 to C3. In the example of FIG. 4, VRIP is a function of IREF, a switching period (T), and a capacitance of C3. As an example, VRIP=IREF*T/C, which is constant at different VIN and VOUT values.

In the example of FIG. 3, the multiplier circuit 432 is configured to provide a charge current (ICHG) based on the reference current (IREF), the input voltage (e.g., using IIN, which is proportional to VIN), and the output voltage (e.g., using IOUT, which is proportional to VOUT). The charge control circuit 431 also includes a current mirror (S5 and S6) configured to mirror ICHG to C3.

More specifically, the multiplier circuit 432 includes a first transistor (e.g., Q1) with a first current terminal coupled to a reference current source (e.g., IREF source 434), with a second current terminal coupled to a ground node, and with a control terminal coupled to an output of the first circuit (e.g., node 416). For the multiplier circuit 432, the current through Q1 when on (referred to as I1 herein) is IREF. The multiplier circuit 432 also includes a second transistor (e.g., Q2) with a first current terminal coupled to a voltage supply node (e.g., VDD node 438), with a second current terminal coupled to the output of the first circuit (e.g., node 416), and with a control terminal coupled to the reference current source (e.g., IREF source 434). For the multiplier circuit 432, the current through Q2 when on (referred to as I2 herein) is IIN. The multiplier circuit 432 also includes a third transistor (e.g., Q3) with a first current terminal coupled to the voltage supply node (e.g., VDD node 438), with a second current terminal coupled to a difference node (e.g., the difference node 440) configured to provide a difference between the first current and the second current (e.g., IIN−IOUT), and with a control terminal coupled to the reference current source (e.g., IREF source 434).

For the multiplier circuit 432, the current through Q3 when on (referred to as I3 herein) is IIN−IOUT. In some examples, IIN−IOUT is provided at the difference node 440 using current mirrors to copy IIN and IOUT, where the mirrored values of IIN and IOUT are used to provide the difference value (IIN−IOUT) at the difference node 440. The multiplier circuit 432 also includes a fourth transistor (e.g., Q4) with a first current terminal coupled to the current mirror (e.g., S5 and S6), with a second current terminal coupled to the ground node, and with a control terminal coupled to the difference node (e.g., the difference node 440). For the multiplier circuit 432, the current through Q4 when on (referred to as I4 herein) is equal to ICHG. Also, the base-to-emitter voltages for Q1 to Q4 (referred to as $V_{BE1}$ to $V_{BE4}$) are related as follows: $V_{BE4}=V_{BE1}+V_{BE2}-V_{BE3}$. Also, the currents I1 to I4 are related as follows: ln(I4)=ln(I1)+ln(I2)−ln(I3)=ln (I1*I2/I3), where ln is the natural logarithm. Thus, for the multiplying circuit 432, I4=I1*I2/I3. also includes a transistor (S7) with current terminals coupled to opposite sides of C3.

As shown, the charge control circuit 431 also includes a switch (S7) coupled across C3 to control when C3 is charged and discharged. More specifically, a first current terminal of S7 is coupled to a first (e.g., top) plate of C3, and a second current terminal of S7 is coupled to a second (e.g., bottom) plate of C3. The control terminal of S7 is configured to receive a control signal (HSDon). When HSDon is low (e.g., the high-side switch is off and low-side switch is on), C3 is charged up to VRI. When HSDon is high (e.g., the high-side switch is on and the low-side switch is off), C3 is discharged. In operation, VRIP is provided to a summing comparator (e.g., the summing comparator 372 in FIG. 3) when the high-side switch (e.g., S1 in FIG. 3) is off and the low-side switch (e.g., S2 in FIG. 3) in on. Otherwise, when the high-side switch is on and the low-side switch is off, the summing comparator is not in use, and VRIP is not needed.

Figure 5:
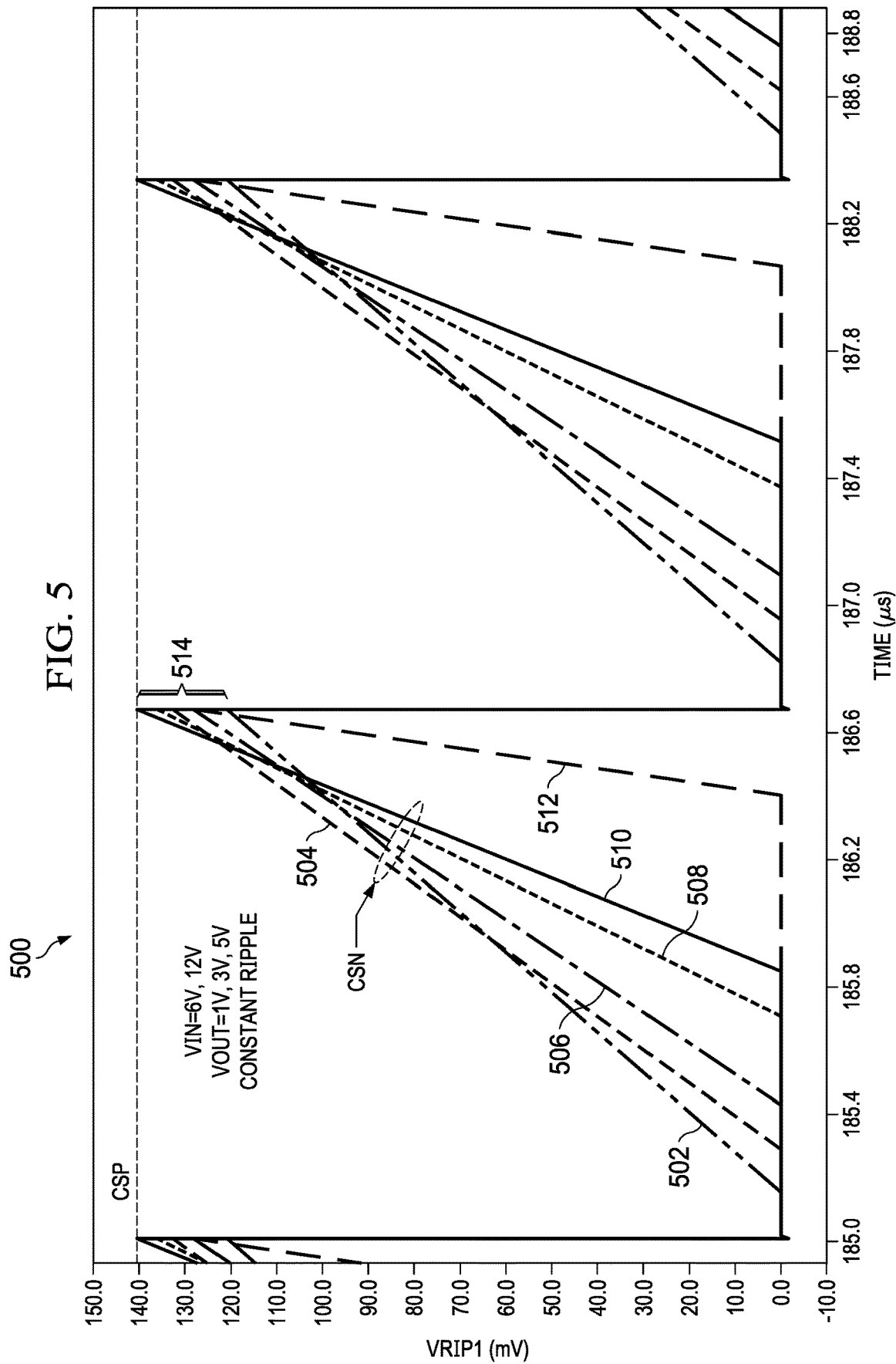
FIG. 5 is a timing diagram showing ripple injection as a function of input voltage (VIN) and VOUT of a switching converter in accordance with some examples.

In some example, the charge control circuit 431 is referred to as a constant charge control circuit (to maintain VRIP constant), where the charge control circuit 431 includes an IREF source 434 coupled to a voltage supply (VDD) node 438 and configured to provide IREF. The charge control circuit 431 also includes a multiplier circuit 432 (e.g., a multiplier circuit based on Q1, Q2, Q3, and Q4) with the IREF source 434, where the multiplier circuit 432 is configured to provide a charge current (ICHG) for C3 by multiplying IREF by a function based on VIN and VOUT. In some examples, the multiplier circuit 432 is configured to provide I4=ICHG=IREF*VIN/(VIN−VOUT). FIG. 5 is a timing diagram 500 showing ripple injection (VRIP1) as a function of VIN and VOUT of a switching converter in accordance with some examples. With different VIN and VOUT values, the on-time for the-side switch (S2) varies, where TOFF=(VIN−VOUT)/VIN*T. In the proposed examples, a charging current (Ichg) is generated as Ichg=IREF*VIN/(VIN−VOUT), where Ichg is used to charge a capacitor. The slopes 502, 504, 506, 508, 510, and 512 represented in FIG. 5 correspond to Ichg/C=IREF*VIN/(VIN−VOUT)/C, which varies according to VIN and VOUT. When the on-time for S2 is finished, or when the summing comparator (e.g., the summing comparator 372) works, VRIP1=Ichg*TOFF/C=IREF*T/C, which is constant. To summarize, for different VIN and VOUT, TOFF varies and the slopes 502, 504, 506, 508, 510, and 512 vary. When TOFF is done, VRIP1=IREF*T/C, which is constant.

Figure 6:
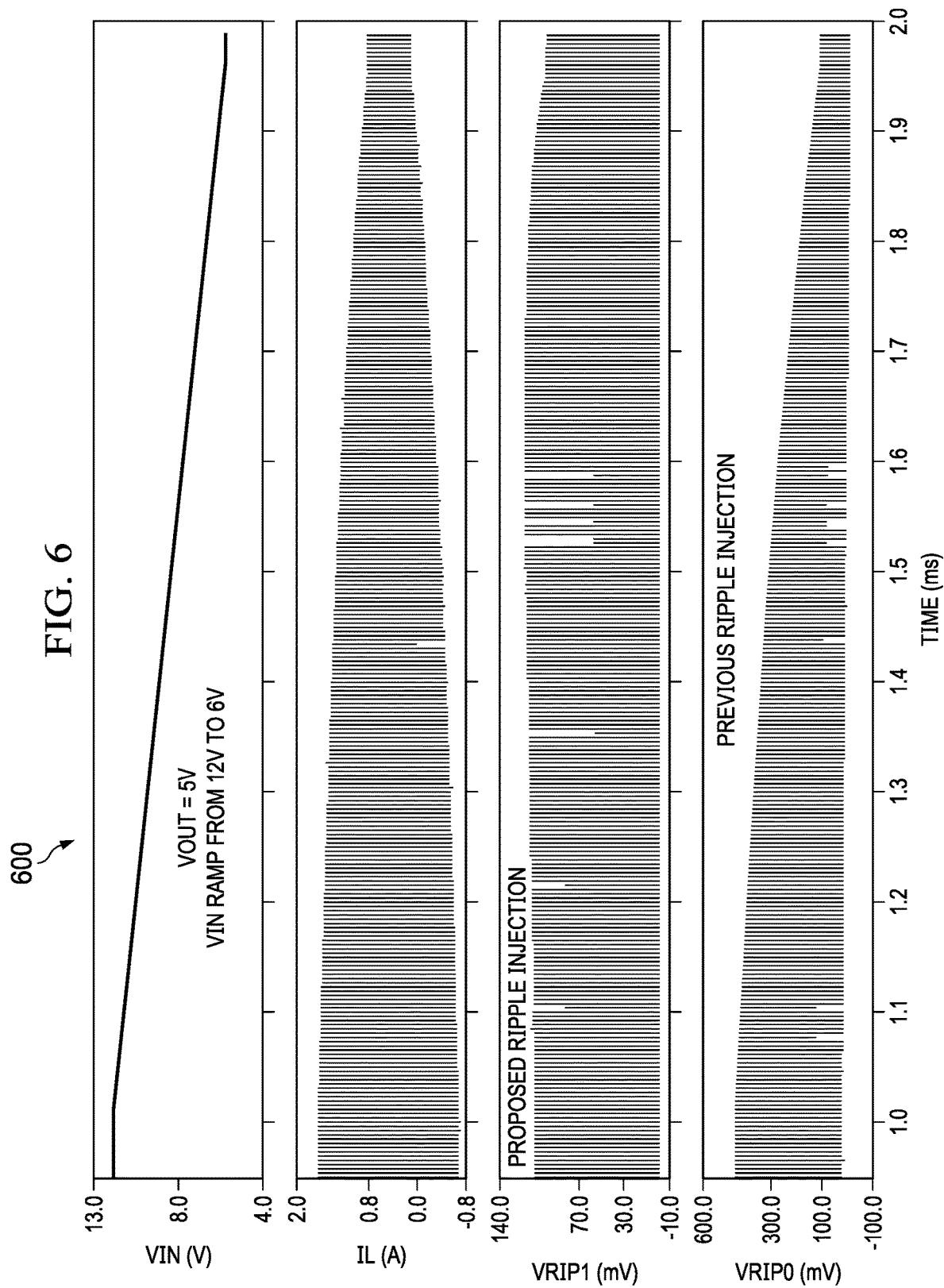
FIG. 6 is a timing diagram showing waveforms of a switching converter as VIN transitions from 12V to 6V in accordance with some examples.

FIG. 6 is a timing diagram 600 showing waveforms (VOUT, IL, VRIP1, and VRIP0) of a switching converter as VIN transitions from 12V to 6V in accordance with some examples. For the timing diagram, a VOUT of 5V is assumed. As shown, as VIN transitions from 12V to 6V, IL and VRIP0 (representing a ripple injection based on a previous ripple injection strategy) are reduced. In contrast, VRIP1 (representing a ripple injection based on the proposed constant ripple injection strategy) stays the same or stays within a threshold tolerance.

Figure 7A:
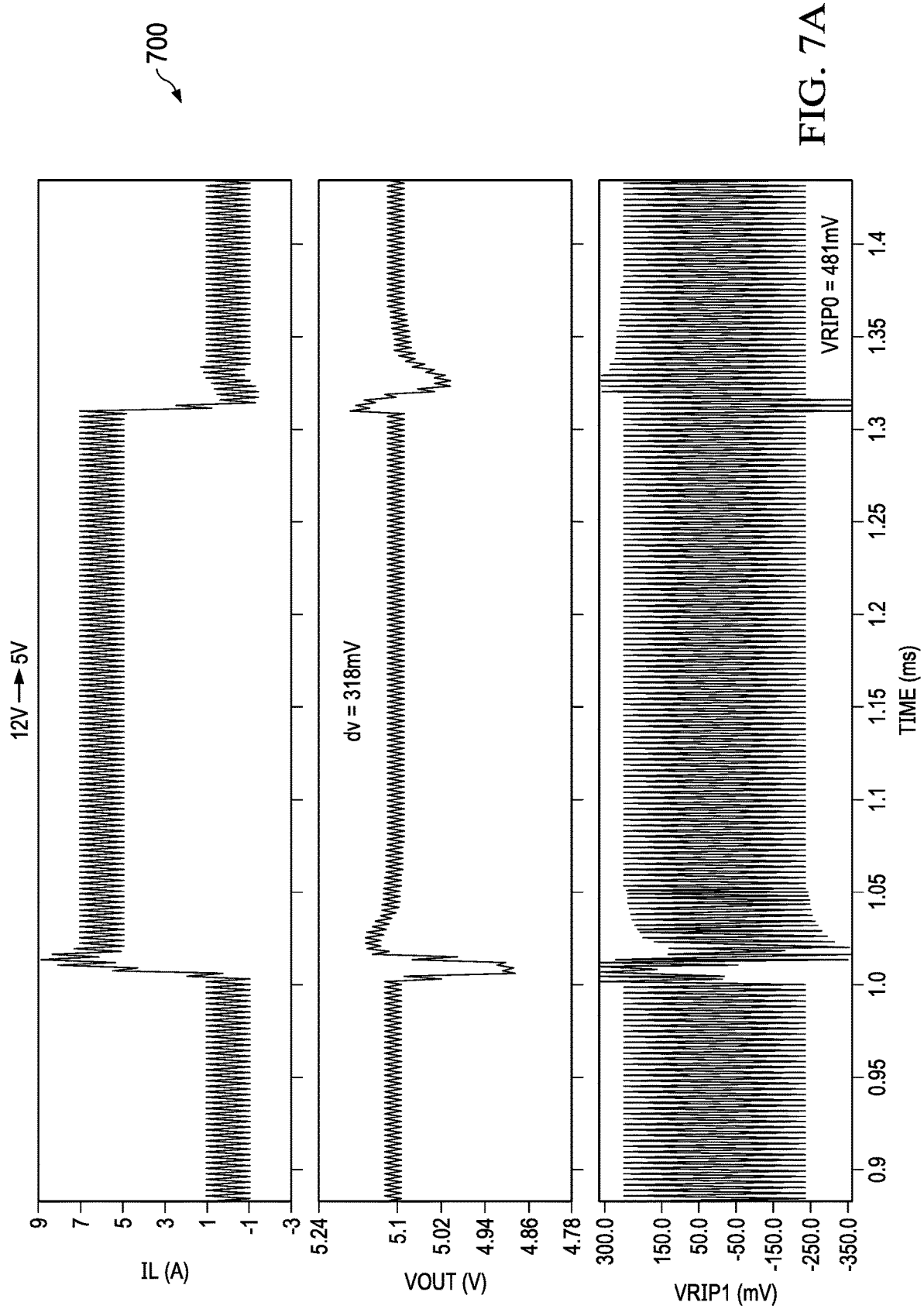
FIGS. 7A and 7B are timing diagrams comparing waveforms of a switching converter with and without the proposed constant ripple injection circuit as VOUT transitions from 12V to 5V in accordance with some examples.
Figure 7B:
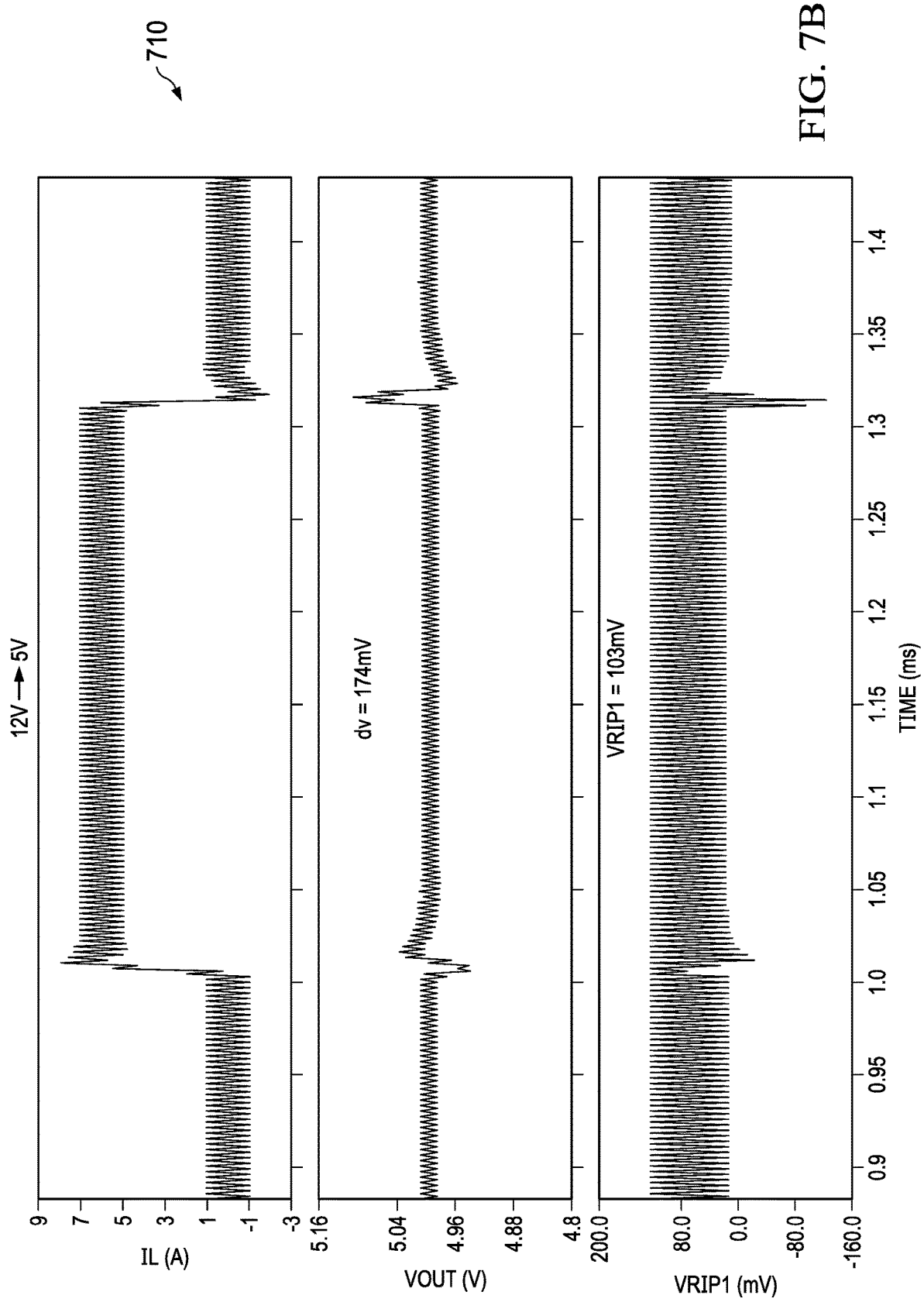

FIGS. 7A and 7B are timing diagrams 700 and 710 comparing waveforms of a switching converter with and without the proposed constant ripple injection circuit (e.g., the constant ripple injection circuit 380 in FIG. 3, or the constant ripple injection circuit 400 in FIG. 4) as VOUT transitions from 12V to 5V in accordance with some examples. In the timing diagram 700 of FIG. 7A, ripple injection based on a previous ripple injection strategy is used, and IL, VOUT, and VRIP0 are represented. In the example of FIG. 7A, the VOUT ripple is 318 mV as VOUT transitions from 12V to 5V. In the timing diagram 710 of FIG. 7B, ripple injection based on the proposed constant ripple injection strategy is used, and IL, VOUT, and VRIP0 are represented. In the example of FIG. 7B, VOUT ripple is 174 mV as VOUT transitions from 12V to 5V, which is a significant improvement over the VOUT ripple of 318 mV in the timing diagram 700 of FIG. 7A.

Figure 8A:
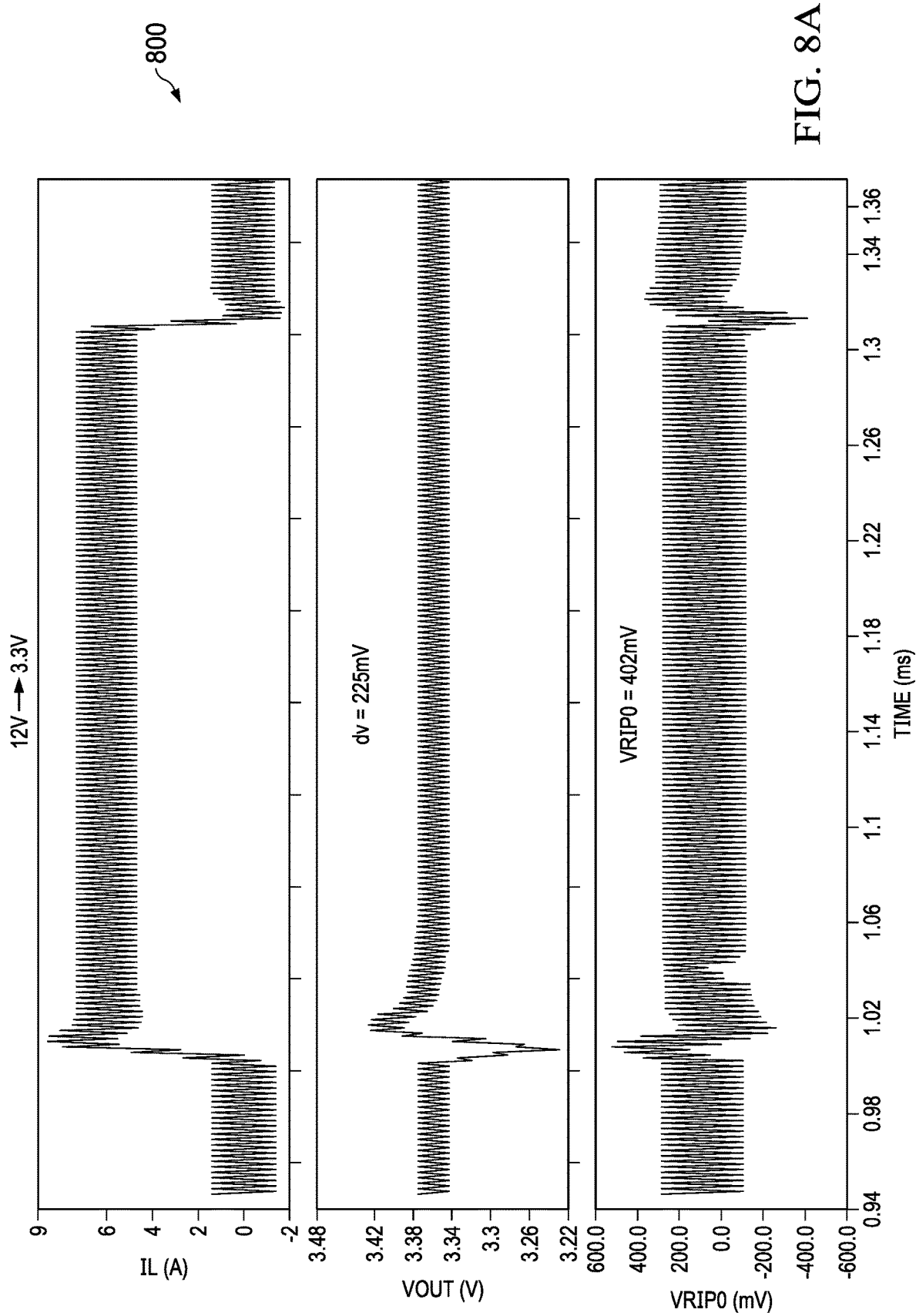
FIGS. 8A and 8B are timing diagrams showing waveforms of a switching converter with and without the proposed constant ripple injection circuit as VOUT transitions from 12V to 3V in accordance with some examples.
Figure 8B:
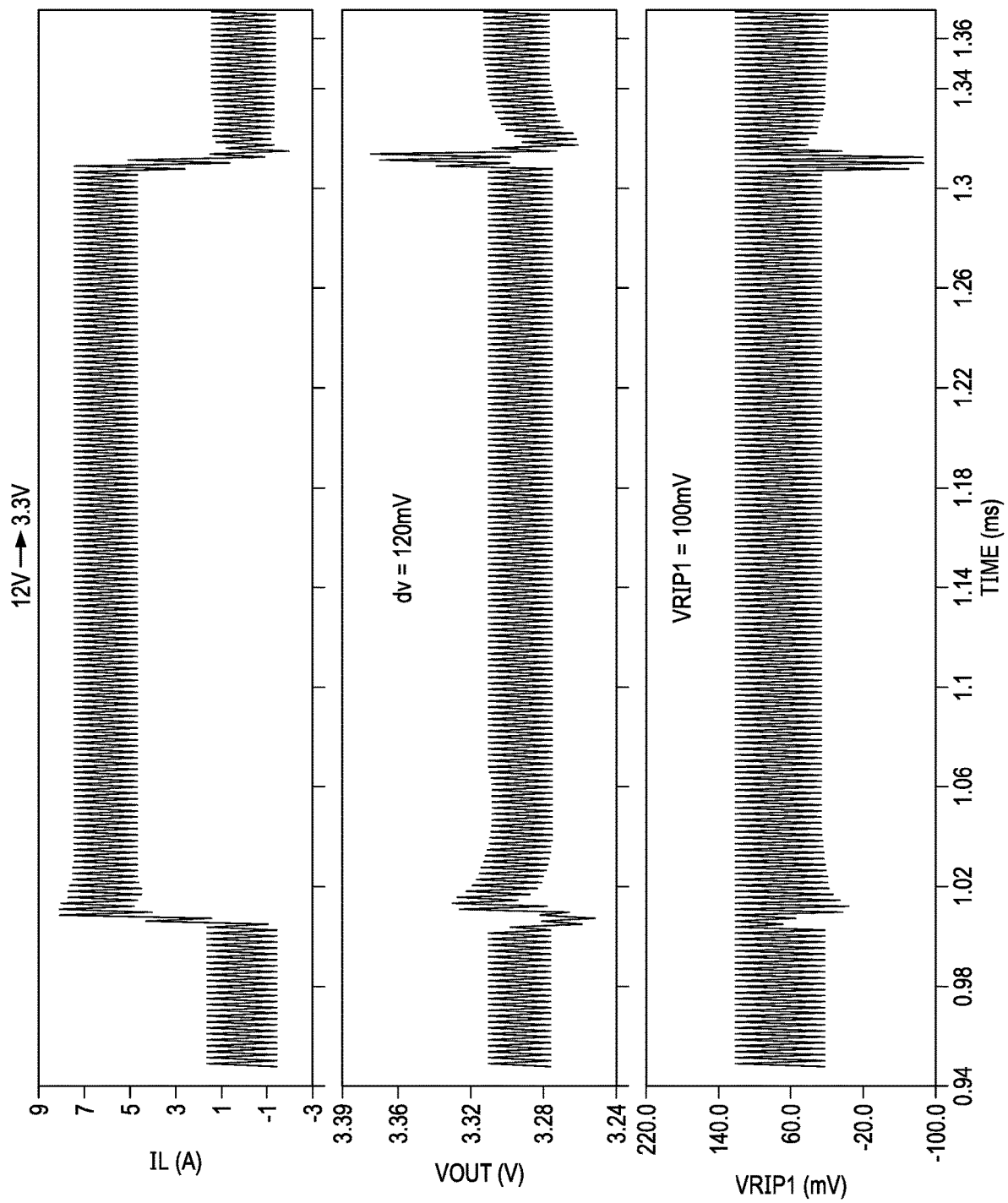

FIGS. 8A and 8B are timing diagrams 800 and 810 comparing waveforms of a switching converter with and without the proposed constant ripple injection circuit (e.g., the constant ripple injection circuit 380 in FIG. 3, or the constant ripple injection circuit 400 in FIG. 4) as VOUT transitions from 12V to 3.3V in accordance with some examples. In the timing diagram 800 of FIG. 8A, ripple injection based on a previous ripple injection strategy is used, and IL, VOUT, and VRIP0 are represented. In the example of FIG. 8A, the VOUT ripple is 225 mV as VOUT transitions from 12V to 3.3V. In the timing diagram 810 of FIG. 8B, ripple injection based on the proposed constant ripple injection strategy is used, and IL, VOUT, and VRIP0 are represented. In the example of FIG. 8B, VOUT ripple is 120 mV as VOUT transitions from 12V to 3.3V, which is a significant improvement over the VOUT ripple of 225 mV in the timing diagram 800 of FIG. 8A.

Figure 9A:
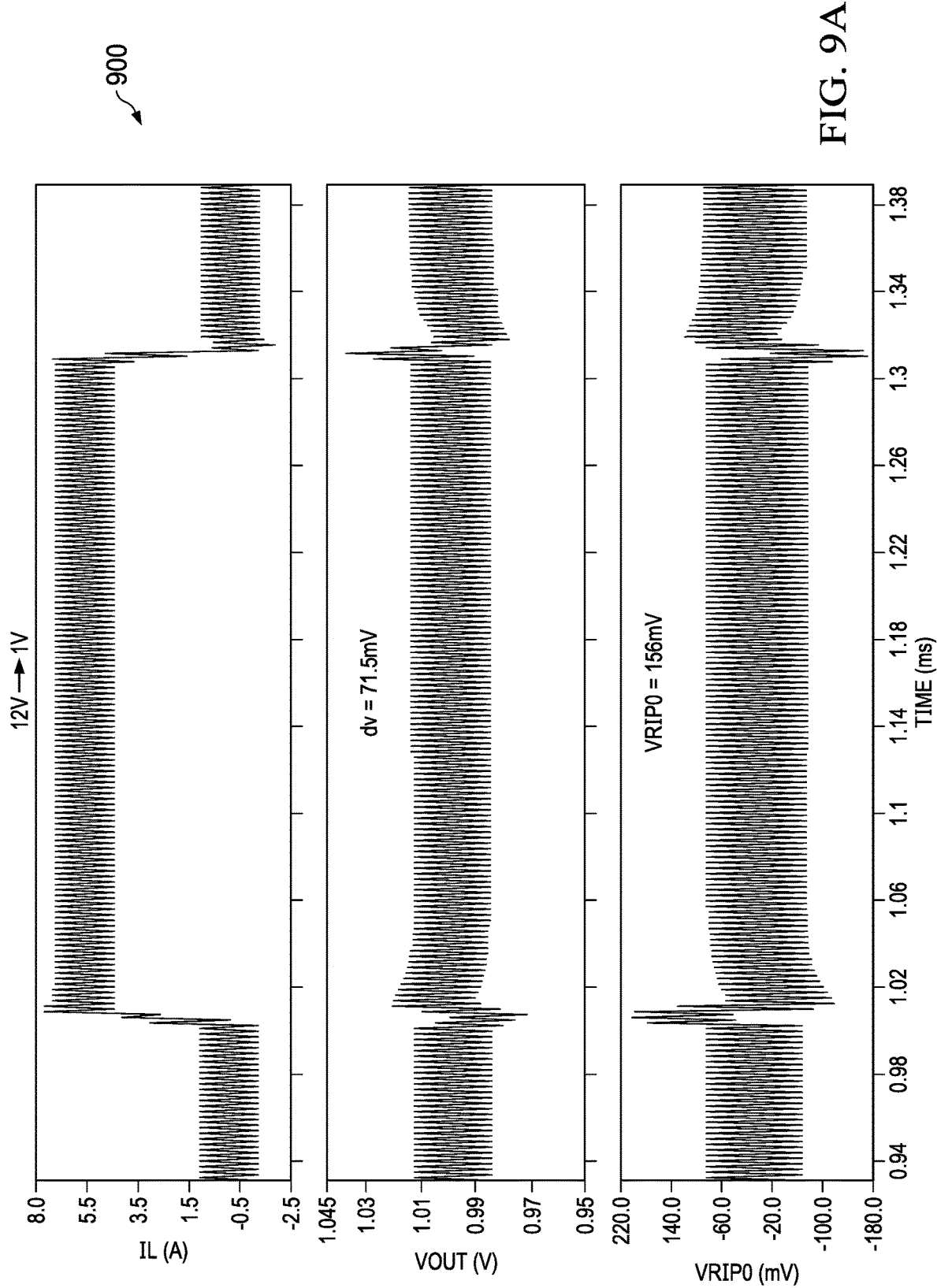
FIGS. 9A and 9B are timing diagrams showing waveforms of a switching converter with and without the proposed constant ripple injection circuit as VOUT transitions from 12V to 1V in accordance with some examples.
Figure 9B:
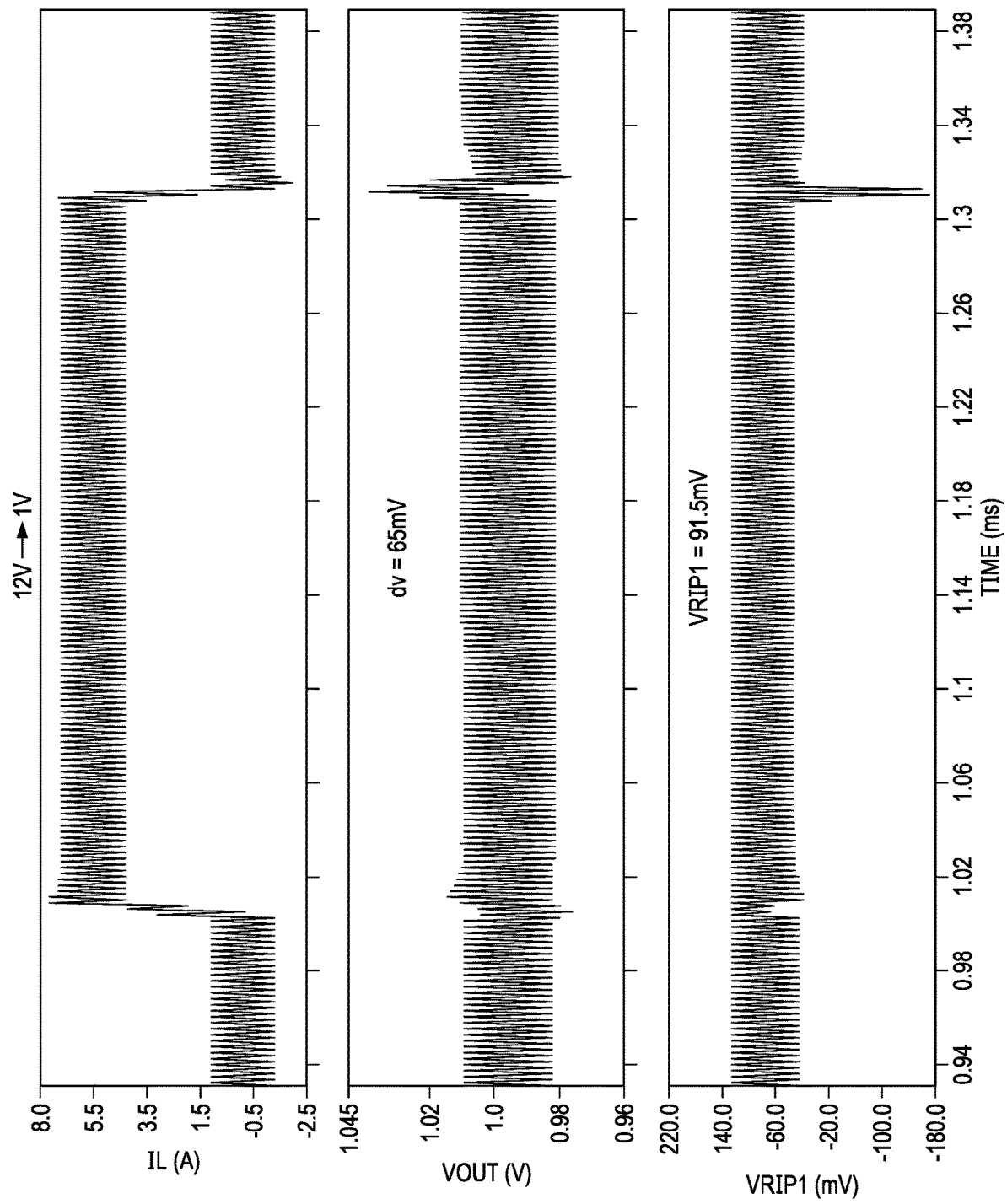

FIGS. 9A and 9B are timing diagrams 900 and 910 comparing waveforms of a switching converter with and without the proposed constant ripple injection circuit (e.g., the constant ripple injection circuit 380 in FIG. 3, or the constant ripple injection circuit 400 in FIG. 4) as VOUT transitions from 12V to 1V in accordance with some examples. In the timing diagram 900 of FIG. 9A, ripple injection based on a previous ripple injection strategy is used, and IL, VOUT, and VRIP0 are represented. In the example of FIG. 9A, the VOUT ripple is 71.5 mV as VOUT transitions from 12V to 1V. In the timing diagram 910 of FIG. 9B, ripple injection based on the proposed constant ripple injection strategy is used, and IL, VOUT, and VRIP0 are represented. In the example of FIG. 9B, VOUT ripple is 65 mV as VOUT transitions from 12V to 1V, which is a small improvement over the VOUT ripple of 71.5 mV in the timing diagram 800 of FIG. 8A.

Figure 10:
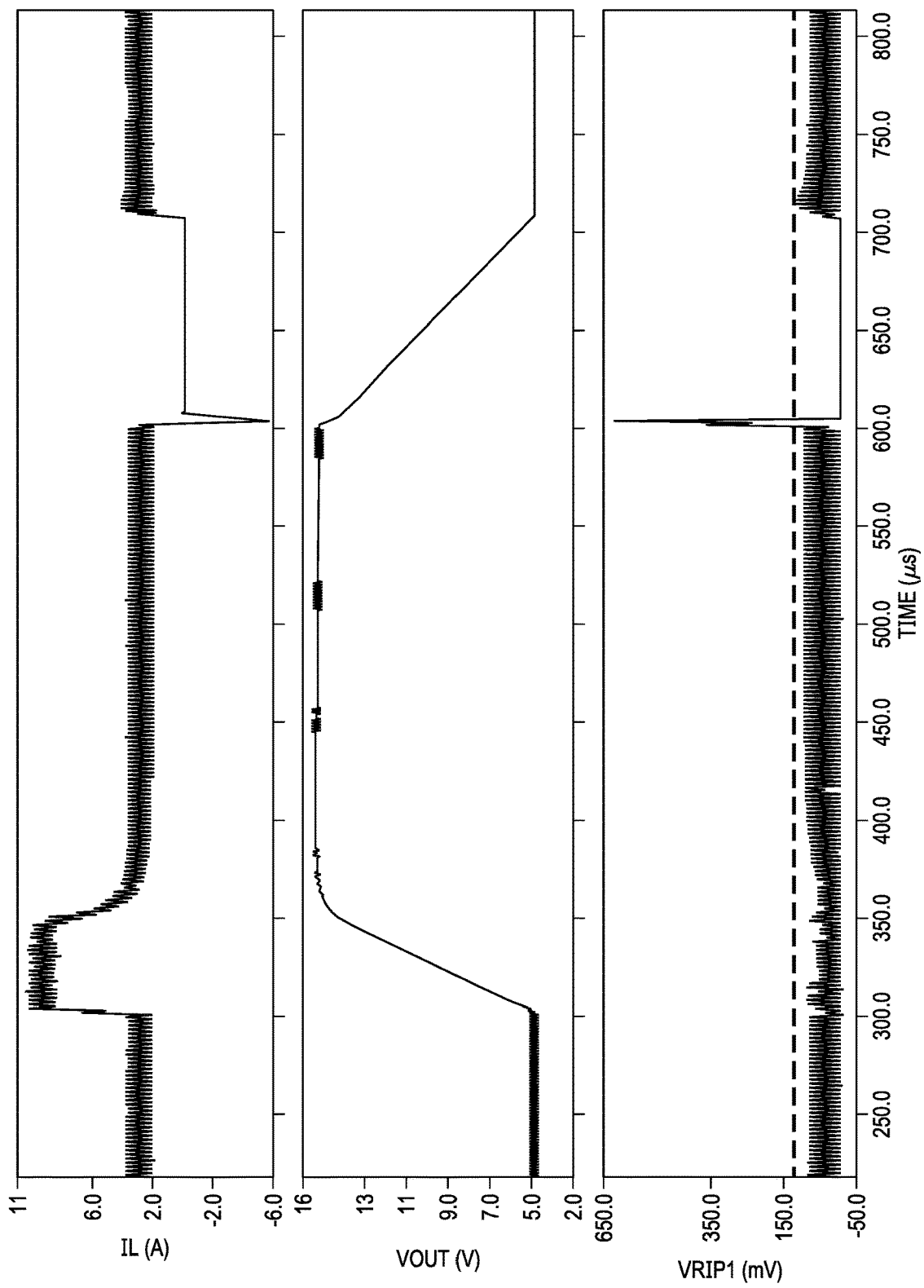
FIG. 10 is a timing diagram showing waveforms of a switching converter with the proposed constant ripple injection circuit as VOUT varies in accordance with some examples.

FIG. 10 is a timing diagram 1000 showing waveforms of a switching converter with the proposed constant ripple injection circuit as VOUT varies in accordance with some examples. In the timing diagram 1000, IL, VOUT and VRIP1 are represented. In another ripple injection technique, CSN=VOUT*R2/(R1+R2). If R2/(R1+R2)=3.5 and VOUT is 15V, then CSN=15/3.5=4.28V. For this DC voltage, the summing comparator (e.g., the summing comparator 372 in FIG. 3) is unable to function. For this reason, previous DCAP (Direct connection to the output Capacitor) switching converters only support 0.6V~7V VOUT (VOUT=15V could not be supported). With the proposed constant ripple injection circuit, higher VOUT values (e.g., 15V) and lower VOUT values (e.g., 5V or 1V) are supported at the same time.

With the proposed constant ripple injection circuit, a constant ripple injection is provided under all VIN and VOUT conditions, including large duty-cycle scenarios (e.g., VIN=6V, VOUT=5V) and small duty-cycle scenarios (e.g., VIN=12V, VOUT=1V). Also, with the proposed constant ripple injection circuit, larger bandwidth and better load response is achieved for a switching converter. Also, high VOUT transitions (e.g., 20V to 9V, 20V to 15V in a USB Type-C scenario). In different examples, the proposed constant ripple injection circuit is applicable to DC-DC buck converters, DC-DC boost converter, DC-DC buck-boost converters.

Certain terms have been used throughout this description and claim to refer to particular system components. As one skilled in the art will appreciate, different parties may refer to a component by different names. This document does not intend to distinguish between components that differ only in name but not in their respective functions or structures. In this disclosure and claims, the terms "including" and "comprising" are used in an open-ended fashion, and thus should be interpreted to mean "including, but not limited to . . . ."

The term "couple" is used throughout the specification. The term may cover connections, communications, or signal paths that enable a functional relationship consistent with the description of the present disclosure. For example, if device A generates a signal to control device B to perform an action, in a first example device A is coupled to device B by direct connection, or in a second example device A is coupled to device B through intervening component C if intervening component C does not alter the functional relationship between device A and device B such that device B is controlled by device A via the control signal generated by device A.

The above discussion is meant to be illustrative of the principles and various embodiments of the present invention. Numerous variations and modifications will become apparent to those skilled in the art once the above disclosure is fully appreciated.

What is claimed is:

1. A system, comprising:
a first switch having a first current terminal, a second current terminal, and a first control terminal;
a second switch having a third current terminal, a fourth current terminal, and a second control terminal, the third current terminal coupled to the second current terminal;
an inductor having a first inductor terminal and a second inductor terminal, the first inductor terminal coupled to the second current terminal;
a control circuit having a first terminal, a second terminal, a third terminal, and a fourth terminal, the first terminal coupled to the first control terminal, the second terminal coupled to the second control terminal, the third terminal coupled to the first current terminal, and the fourth terminal coupled to the second inductor terminal, the control circuit comprising:
a switch driver circuit coupled to the first terminal and to the second terminal;
a comparator having a comparator input and a comparator output, the comparator output coupled to the switch driver circuit; and
a ripple injection circuit coupled to the comparator input, the third terminal, and the fourth terminal, the ripple injection circuit comprising:
a first circuit configured to produce a first current based on a voltage at the third terminal;
a second circuit configured to produce a second current based on a voltage at the fourth terminal; and
a third circuit configured to produce a ripple injection voltage at the comparator input based on the first current and the second current.

2. The system of claim 1, wherein the comparator input is a first comparator input, the comparator has a second comparator input and a third comparator input, the second comparator input configured to receive a feedback voltage and the third comparator input configured to receive a reference voltage, and wherein the comparator is configured to output a control signal at the comparator output.

3. The system of claim 1, wherein:
the first current is proportional to the voltage at the third terminal; and
the second current is proportional to the voltage at the fourth terminal.

4. The system of claim 1, wherein the third circuit comprises:
a capacitor; and
a charge control circuit coupled to the capacitor, wherein the charge control circuit is configured to charge the capacitor based on a reference current, the first current, and the second current.

5. The system of claim 4, wherein the charge control circuit comprises:
a multiplier circuit configured to provide a charge current based on the reference current, the first current, and the second current; and
a current mirror configured to mirror the charge current to the capacitor.

6. The system of claim 4, wherein the ripple injection voltage is a function of the reference current, a switching period, and a capacitance of the capacitor.

7. The system of claim 1, further comprising a load coupled between the second inductor terminal and a ground terminal.

8. The system of claim 7, wherein the load is a USB power delivery adapter.

9. A control circuit for a switching converter, the control circuit comprising:
a first circuit configured to produce a first current proportional to an input voltage of the switching converter;
a second circuit configured to produce a second current proportional to an output voltage of the switching converter;
a third circuit coupled to the first circuit and to the second circuit, wherein the third circuit comprises:
a ripple injection charge capacitor; and
a charge control circuit coupled to the ripple injection charge capacitor, wherein the charge control circuit is configured to provide a charge current to the ripple injection charge capacitor based on the first current and the second current.

10. The control circuit of claim 9, wherein the first circuit comprises:
an operational amplifier having an operational amplifier input; and
a voltage divider coupled to the operational amplifier input, the voltage divider configured to receive the input voltage of the switching converter.

11. The control circuit of claim 10, wherein the input of the operational amplifier is a first input and the first circuit further comprises:
a transistor coupled to an output of the operational amplifier; and
a resistor coupled between the output of the operational amplifier and a ground node, wherein the output of the operational amplifier is input to a second input of the operational amplifier.

12. The control circuit of claim 9, wherein the second circuit comprises:
an operational amplifier having a first input, a second input, and an output; and a voltage divider coupled to the first input of the operational amplifier.

13. The control circuit of claim 12, wherein the second circuit further comprises:
    an RC filter coupled between an intermediate node of the voltage divider and the first input of the operational amplifier;
    a transistor coupled to the output of the operational amplifier; and
    a resistor coupled between the output of the operational amplifier and a ground terminal, wherein the output of the operational amplifier is coupled to the second input of the operational amplifier, and wherein the output of the second circuit is a current proportional to the output voltage of the switching converter.

14. The control circuit of claim 9, wherein the charge control circuit comprises:
    a current source configured to produce a reference current; and
    a multiplier circuit coupled to the current source, wherein the multiplier circuit is configured to provide a charge current for the ripple injection charge capacitor by multiplying the reference current by a function based on the input voltage and the output voltage of the switching converter.

15. The control circuit of claim 14, wherein the multiplier circuit is configured to provide the charge current as $I_{CHG}=I_{REF}*V_{IN}/(V_{IN}-V_{OUT})$, where $I_{REF}$ is the reference current, $V_{IN}$ is the input voltage of the switching converter, and $V_{OUT}$ is the output voltage of the switching converter.

16. A switching converter, comprising:
    a switch driver circuit;
    a comparator having a comparator input and a comparator output, the comparator output coupled to the switch driver circuit; and
    a ripple injection circuit coupled to the comparator input, the ripple injection circuit comprising:
        a first circuit configured to produce a first current proportional to an input voltage;
        a second circuit configured to produce a second current proportional to an output voltage; and
        a third circuit coupled to the first circuit, the second circuit, and the comparator input, the third circuit configured to provide a ripple injection voltage to the comparator input based on the first current and the second current.

17. The switching converter of claim 16, wherein:
    the first circuit comprises:
        a first operational amplifier; and
        a first voltage divider coupled to a first input of the first operational amplifier, the first voltage divider configured to receive the input voltage;
    the second circuit comprises:
        a second operational amplifier; and
        a second voltage divider coupled to a first input of the second operational amplifier, the second voltage divider configured to receive the output voltage; and
    the third circuit comprises:
        a capacitor; and
        a charge control circuit coupled to the capacitor, wherein the charge control circuit is configured to charge the capacitor based on a reference current, the first current, and the second current.

18. The switching converter of claim 17, wherein the charge control circuit comprises:
    a multiplier circuit configured to provide a charge current based on the reference current, the input voltage, and the output voltage; and
    a current mirror configured to mirror the charge current to the capacitor.

19. The switching converter of claim 18, wherein the multiplier circuit comprises:
    a first transistor with a first current terminal, a second current terminal, and a first control terminal, the first current terminal coupled to a reference current source, the second current terminal coupled to a ground terminal, and the first control terminal coupled to an output of the first circuit;
    a second transistor having a third current terminal, a fourth current terminal, and a second control terminal, the third current terminal coupled to a voltage supply terminal, the fourth current terminal coupled to the output of the first circuit, and the second control terminal coupled to the reference current source;
    a third transistor having a fifth current terminal, a sixth current terminal, and a third control terminal, the fifth current terminal coupled to the voltage supply terminal, the sixth current terminal configured to receive a difference between the first current and the second current, and the third control terminal coupled to the reference current source; and
    a fourth transistor having a seventh current terminal, an eighth current terminal, and a fourth control terminal, the seventh current terminal coupled to the current mirror, the eighth current terminal coupled to the ground terminal, and the fourth control terminal coupled to the sixth current terminal.

20. The switching converter of claim 19, wherein the charge current is calculated as $I_{CHG}=I_{REF}*V_{IN}/(V_{IN}-V_{OUT})$, where $I_{REF}$ is the reference current, $V_{IN}$ is the input voltage, and $V_{OUT}$ is the output voltage.

21. A control circuit for a switching converter, the control circuit comprising:
    a ripple injection charge capacitor; and
    a charge control circuit coupled to the ripple injection charge capacitor, wherein the charge control circuit comprises:
        a multiplier circuit configured to provide a charge current based on a reference current, an input voltage of the switching converter, and an output voltage of the switching converter; and
        a current mirror coupled to the ripple injection charge capacitor and to the multiplier circuit, the current mirror configured to mirror the charge current to the ripple injection charge capacitor.

22. The control circuit of claim 21, wherein the multiplier circuit comprises:
    a first transistor having a first current terminal, a second current terminal, and a first control terminal, the first current terminal coupled to a current source, the second current terminal coupled to a ground terminal, and the first control terminal configured to receive a first current;
    a second transistor having a third current terminal, a fourth current terminal, and a second control terminal, the third current terminal coupled to a voltage supply terminal, the fourth current terminal coupled to the first control terminal, and the second control terminal coupled to the current source;
    a third transistor having a fifth current terminal, a sixth current terminal, and a third control terminal, the fifth current terminal coupled to the voltage supply terminal, the sixth current terminal configured to receive a difference between the first current and a second current, and the third control terminal coupled to the current source; and a fourth transistor having a seventh current terminal, an eighth current terminal, and a fourth control terminal, the seventh current terminal coupled to the current mirror, the eighth current terminal coupled to the ground terminal, and the fourth control terminal coupled to the sixth current terminal.

* * * * *